Jan. 1, 1974    E. J. ROCK    3,782,919
METHOD OF MIXING WITH INCLINED ROTARY KILN
TO PROVIDE METAL FOAM
Filed Jan. 17, 1972

United States Patent Office 3,782,919
Patented Jan. 1, 1974

3,782,919
METHOD OF MIXING WITH INCLINED ROTARY KILN TO PROVIDE METAL FOAM
Edward J. Rock, Blue Mounds, Wis., assignor to Johan Bjorksten, Madison, Wis.
Filed Jan. 17, 1972, Ser. No. 218,312
Int. Cl. C21c 1/08
U.S. Cl. 75—20 F          4 Claims

ABSTRACT OF THE DISCLOSURE

Molten metal, high melting fibers and foaming agent are mixed in a rotating inclined tube to provide foamable and foaming material to provide metal foam bodies.

FIELD

This invention relates to processes for producing metal foam bodies.

PRIOR ART

| U.S. patents | Patentee | Issue date | Classification |
| --- | --- | --- | --- |
| 2,434,775 | Sosnick | 1/20/48 | 75-20 |
| 2,553,016 | do | 5/15/51 | 75-20 |
| 2,751,289 | Elliott | 6/10/56 | 75-20 |
| 2,983,597 | do | 5/ 9/61 | 75-20 |
| 3,047,383 | Slayter | | 75-201 |

SUMMARY

Heretofore it has been regarded as necessary to introduce a large amount of energy into the mixing of molten metal and foaming agent in order to provide a suitable mixture for the production of metal foam bodies. Thus, the use of high shear forces has been described in the above cited Elliott Pat. 2,751,289 and the use of high intensity mixers, rotating at rapid rates for short periods of time, has been described in other references, e.g. above cited Elliot Pat. 2,983,597.

In contradistinction to such prior practices and the teachings of such disclosures it has been found desirable in accordance with the present invention to prepare suitable mixtures by suitable operation utilizing minimal energy while carrying out the mixing operation over a period of time which may be varied widely over those considered necessary heretofore. Furthermore this method makes possible incorporating high melting additive members in high concentration.

Thus, in a representative example, 65 pounds aluminum, 35 pounds magnesium and 10 pounds titanium hydride are mixed at 460° C. for one hour in a rotating tubular mixer corresponding to a rotary kiln and then this mixture, now molten and consisting of a eutectic alloy of aluminum and magnesium having titanium hydride incorporated therein, is fed to a similar mixer and mixed therein for 5 minutes with 1000 pounds of molten aluminum and 200 pounds of steel wire fibers having an average length of ½ inch and an average diameter of .023 inch (24 gauge). The mixture thus prepared was poured into molds wherein it foamed and was then cooled and thereupon solidified to provide metal foam bodies having wire members incorporated therein in greater concentrations than has been possible heretofore by other methods.

OBJECTS

It is therefore an object to provide an improved method for providing metal foam bodies.

Another object is an improved method for mixing ingredients for providing metal foam bodies.

Another object is an improved method for incorporating high proportions of high melting fibrous reinforcing members in metal foam bodies.

Other objects will become apparent from the following detailed description.

DRAWINGS

Figure 1:
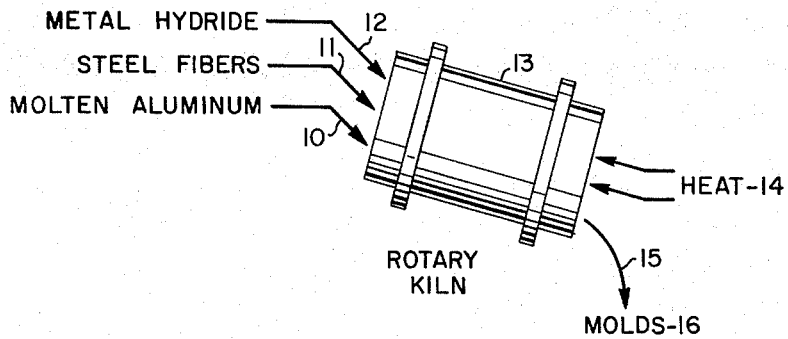
Figure 2:
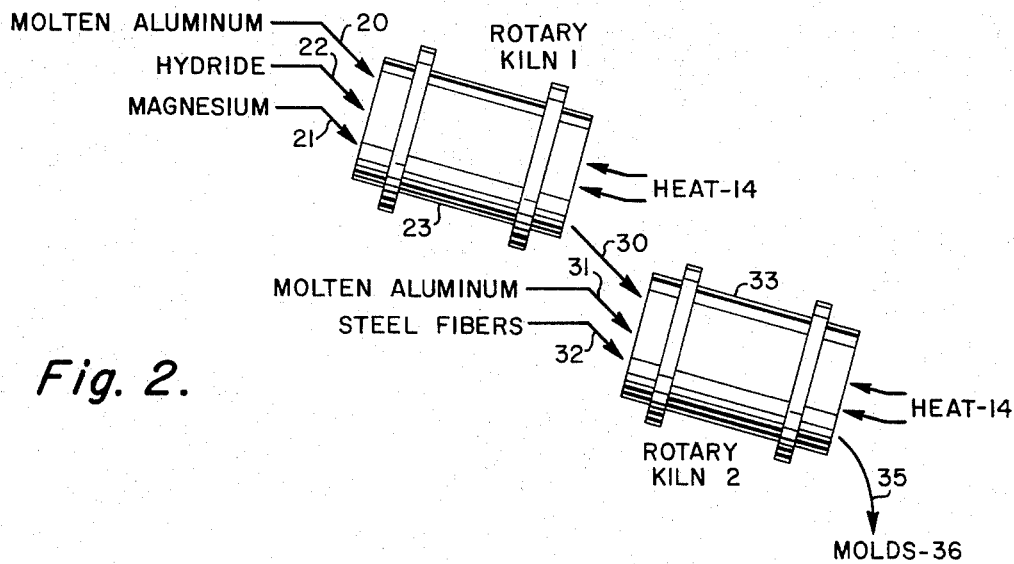

In the drawings like reference numerals refer to like parts and:
FIG. 1 is a schematic view of one embodiment;
FIG. 2 is a schematic view of another embodiment.

DESCRIPTION

In accordance with the invention, as shown in FIG. 1, molten aluminum, steel fibers and metal hydride, as indicated by arrows 10, 11, and 12 are introduced into a heated rotating inclined tube 13 which may be a rotary kiln as shown.

As indicated at 14, heat may be directed into the lower end of the kiln, as from the flame of a burner. Additionally or alternatively heat may be applied to the exterior of the tube by any suitable means.

The interior of the tube or kiln may be provided with flights in any desired arrangement to facilitate mixing.

In place of molten aluminum there may be used zinc, lead, tin, iron or any of a large number of alloys of any of these. The kiln is preferably heated to a temperature slightly higher than the melting point of the metal used.

The steel fibers may be in the form of pieces of wire, shavings, whiskers or the like and in place of steel fibers there may be used steel shot or fibers or other particles of other metals such as copper or brass or glass or vitreous silica fibers or glass beads of small diameter. Such fibers or other particles are not limited except that they are preferably substantially higher melting than and substantially non-soluble in the molten metal used. Such fibers or other particles may be added from a vibrating or shaking feeder, belt conveyor or other suitable feeding mechanism.

Although any foaming agent may be added in place of metal hydride as a foaming agent, metal hydride is preferred and generally either zirconium hydride or titanium hydride is most preferred. The metal hydride may be added in granular form, either alone or in admixture with powder or granules of the same metal, the molten metal or in admixture with powder or granules of one or more metals alloyable with the molten metal.

Proportions of foaming agent to molten metal are not critical but generally foaming agent is added in the proportion of from 0.2% to 3% by weight of the molten metal added.

The proportion of fibers or other particulate material is not critical in that relatively small percentages may be added but is critical in that relatively high percentages such as on the order of 15% to as high as even 35% may be added whereas addition of such high proportions of such particulate material has been proven impossible with certain other methods and is believed impracticable with still other methods.

The specific mode of function of the kiln is of critical importance to the success of the process of the invention. In the kiln or other inclined rotating tube, successive portions of the materials to be mixed are constantly and repeatedly lifted and then dropped for short distances on other portions to be mixed with corresponding commingling with such portions. Also, during the lifting of each portion, shear and commingling takes place within that portion because the mechanical lifting action of the tube wall and/or flight attached thereto is applied only to parts of the portion which are adjacent to the lifting member.

The product of mixing in tube 13, as indicated by arrow 15, may be introduced into molds 16 wherein foaming action may be completed and the material may then cool and solidify to provide metal foam bodies having fibrous or other particulate bodies incorporated therein.

Referring now to FIG. 2, inclined rotating tube 23 and inclined rotating tube 33 indicated respectively as rotary kiln #1 and rotary kiln #2 may be identical or similar to each other and to tube 13. Tubes 13, 23 and 33 may have different lengths, different diameters and different angles of inclination. They may be cylindrical in interior shape or may have polygonal cross-sections and may, if desired, be provided with flights in various patterns which may be the same in all tubes or may vary from tube to tube.

In accordance with one process illustrated in FIG. 2, molten aluminum or other suitable molten metal as discussed above may be introduced to tube 23 as indicated by arrow 20. Magnesium metal may be introduced to tube 23 as indicated by arrow 21, magnesium metal being selected for the embodiments illustrated as alloyable with aluminum and as forming a eutectic alloy therewith having a markedly lower melting point than that of aluminum or most alloys thereof and most specifically lower than the thermal decomposition point of the hydride to be added and lower than the melting point of the final matrix metal to be provided in the final desired metal foam body. Thus, if a molten metal other than aluminum is used there may be used in place of magnesium some metal alloyable with such other metal to form an alloy melting at a sufficiently low temperature to avoid decomposition of foaming agent incorporated therein. In the instance of magnesium, the metal may be added in molten form if a suitable atmosphere is provided but is generally added in the form of a plurality of solid pieces, such as granules, from a vibrating feeder, conveyor or other suitable feeding device.

Foaming agent which is preferably a hydride such as titanium hydride or zicronium hydride may be added to tube 23 as indicated by arrow 22, in particulate form from any suitable feeding device such as a vibratory feeder. The proportion of foaming agent added may suitably vary widely, depending on the metals used. In the instance of adding aluminum and magnesium alloy to provide an aluminum-magnesium eutectic alloy, the hydride added may be from 5% to 25% by weight of the weight added of the metals and in one preferred embodiment may be 10%.

The product of mixing in tube 23 may be added, either while molten or after cooling, solidifying and grinding, to tube 33 as indicated by arrow 30. If added while molten it may be conveyed directly from tube 23. If added after solidifying and grinding it may be introduced from a vibratory or other suitable feeder for feeding solid particulate materials.

Molten aluminum or other molten metal usable in place thereof as discussed in connection with FIG. 1 may be added to tube 33 as indicated by arrow 31. Fibrous or other particulate material as used in the embodiment of FIG. 1 may be added to tube 33 as indicated by arrow 32.

The proportions of material added in accordance with arrow 32 may correspond to the proportions of the embodiment of FIG. 1.

The proportion of material added in accordance with arrow 30 (mixing product from tube 23) to molten metal added in accordance with arrow 31 may depend on the proportion of foaming agent in material 30 but in a suitable instance, wherein the foaming agent constitutes 10% of material 30, material 30 may be added in the ratio of one part of material to 9 parts of material 31. The specific proportions are not critical to the process of the invention except as discussed above in connection with the fibrous or other particulate material.

As still another embodiment, material 31 may be prepared by a process other than the process of the invention and accordingly, other than in tube 23, for example in accordance with the process of co-pending application Ser. 139,606, filed May 3, 1971.

The product of mixing in tube 33 may be introduced, as indicated by arrow 35, into molds 36 wherein foaming may be completed and the resultant moldings cooled and solidified to provide metal foam bodies having fibrous or other particulate material incorporated therein in accordance with the invention.

Having thus described the invention, the claims follow.

I claim:

1. In the method of making a metal foam body having from a small percentage up to about 32% of high melting fibrous particulate members incorporated therein which includes the steps of mixing molten metal and foaming agent for said molten metal which decomposes at the temperature of said molten metal to produce gas to foam said molten metal and fibrous members of metal having a melting point substantially above the melting point of said molten metal, the combination of the steps of
   providing a hollow member having an axis and an upper end and a lower end,
      said hollow member rotatable around said axis,
      providing said axis at an angle inclined to the horizontal,
      said hollow member having an opening at its upper end and an opening at its lower end,
   heating said hollow member,
   rotating said hollow member around said inclined axis,
   introducing said molten metal into said hollow member through said opening at said upper end while rotating and while heating said hollow member,
   introducing said foaming agent into said hollow member through said opening at said upper end while rotating and heating said hollow member,
   introducing said fibrous members into said hollow member through said opening at said upper end while rotating and heating said hollow member,
   thereby mixing said foaming agent and said fibrous members and said molten metal, and thereby
   causing said foaming agent to decompose to produce gas to foam said molten metal,
   to provide non-solid hot foamed and foaming metal having said fibrous members incorporated therein, and
   emptying said foamed and foaming metal having said fibrous members incorporated therein from said hollow member through said opening at the lower end of said hollow member while said hollow member is rotating, and
   cooling said foamed and foaming metal having said fibrous members incorporated therein to provide a metal foam body having said fibrous members incorporated therein.

2. The method of claim 1 wherein said molten metal is aluminum, said fibrous members are steel and said foaming agent is a metal hydride.

3. The method of claim 2 wherein said metal hydride is in particulate form.

4. The method of claim 3 wherein said metal hydride in particulate form is incorporated in molten eutectic alloy of essentially aluminum and magnesium.

References Cited

UNITED STATES PATENTS

| 2,983,597 | 5/1961  | Elliott      | 75—20 F   |
| 3,305,902 | 2/1967  | Bjorksten    | 75—20 F   |
| 1,916,170 | 6/1933  | Hart         | 266—34 R  |
| 3,469,952 | 9/1969  | Baker        | 29—191.6  |
| 3,300,296 | 1/1967  | Hardy et al. | 75—20 F   |
| 2,751,289 | 6/1956  | Elliott      | 75—20 F   |
| 3,224,846 | 12/1965 | Fiedler et al. | 29—191.6 |

FOREIGN PATENTS

| 982,668 | 2/1965 | Great Britain | 29—191.6 |

L. DEWAYNE RUTLEDGE, Primary Examiner

W. R. SATTERFIELD, Assistant Examiner

U.S. Cl. X.R.

75—68 R; 161—172, 176; 266—34 A, 36 A